DIFFERENTIAL HYDRAULIC CYLINDER MECHANISM
Original Filed May 4, 1965 2 Sheets-Sheet 1
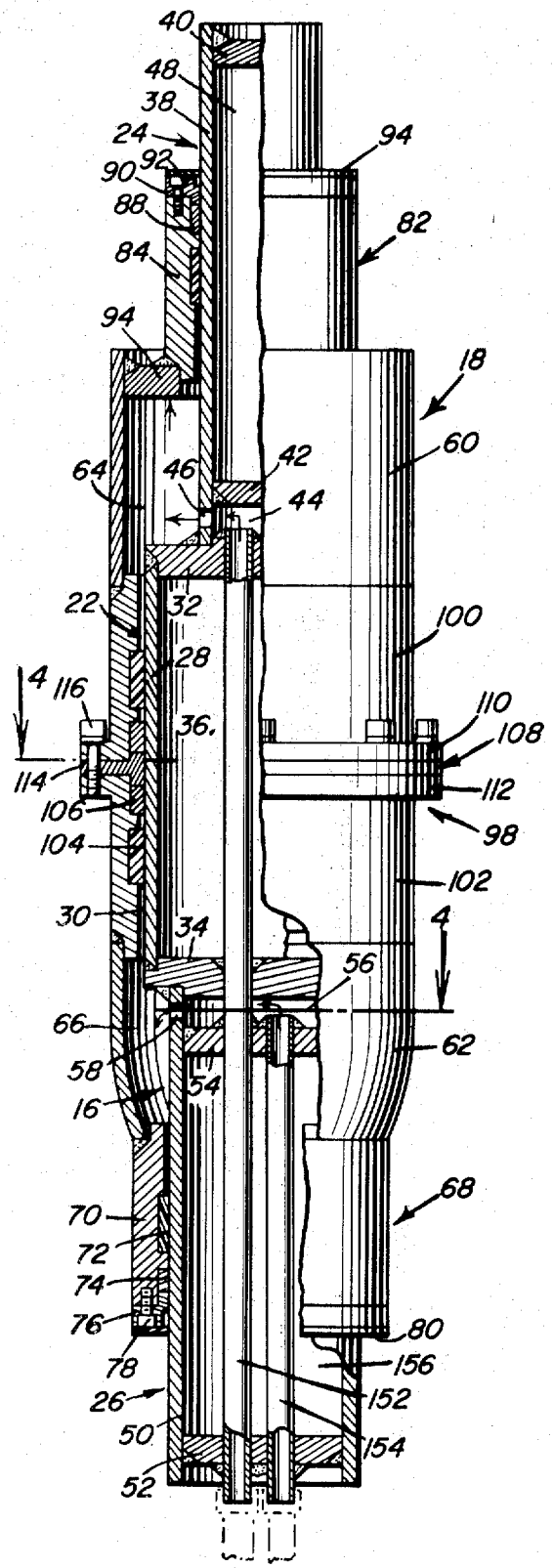
Fig. 1
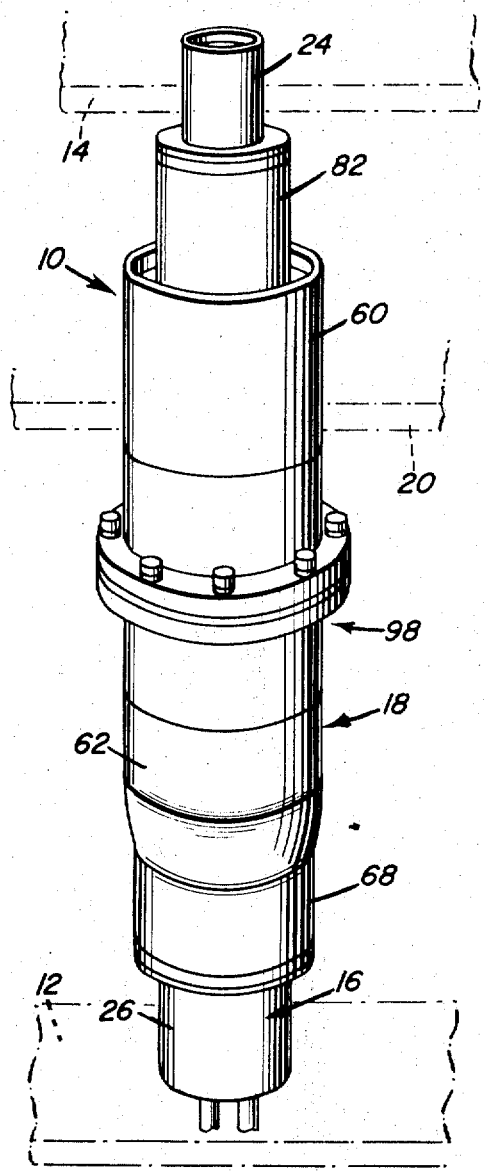
Robert B. McCreery
INVENTOR.
BY Clarence A. O'Brien and Harvey B. Jacobson
Attorneys DIFFERENTIAL HYDRAULIC CYLINDER MECHANISM
Original Filed May 4, 1965 2 Sheets-Sheet 2
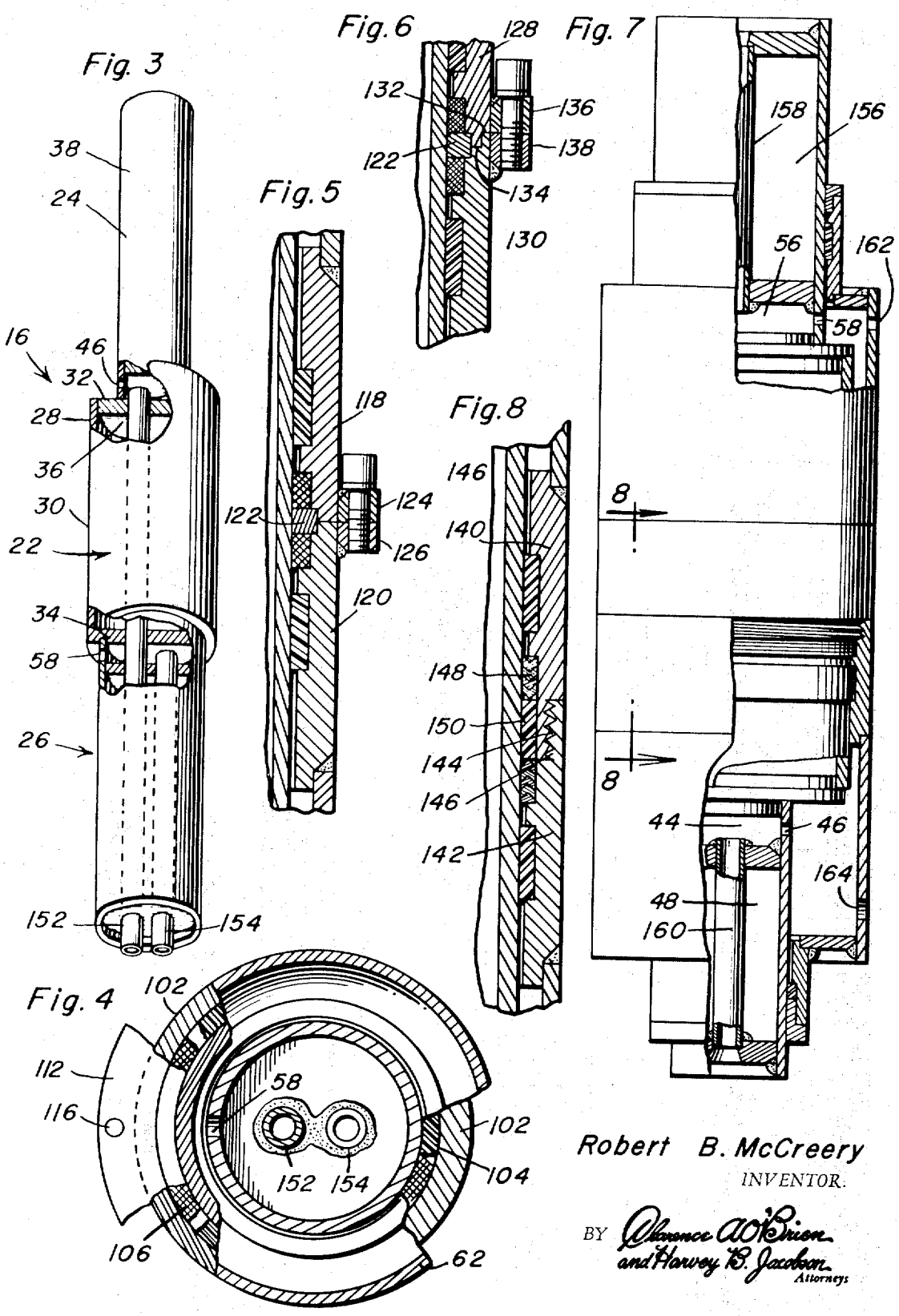
Robert B. McCreery
INVENTOR.
BY Clarence A. O'Brien and Harvey B. Jacobson
Attorneys United States Patent Office Re. 27,204
Reissued Oct. 26, 1971

27,204
DIFFERENTIAL HYDRAULIC CYLINDER MECHANISM

Robert B. McCreery, P.O. Box 157,
Xenia, Ohio 45385

Original No. 3,181,436, dated May 4, 1965, Ser. No. 165,761, Jan. 12, 1962. Application for reissue May 1, 1967, Ser. No. 641,060
Int. Cl. F01b *15/02*
U.S. Cl. 92—117 14 Claims

Matter enclosed in heavy brackets [ ] appears in the original patent but forms no part of this reissue specification; matter printed in italics indicates the additions made by reissue.

*ABSTRACT OF THE DISCLOSURE*

*A stationary piston rod forming a load supporting column slidably and rotatably mounts a cylinder assembly to enclose fluid pressure chambers on opposite sides of a piston. Fluid under pressure is supplied to the pressure chambers through conduits extending through the piston rod in order to elevate or lower the cylinder assembly supporting a load.*

This invention relates to a fluid pressure operated load handling mechanism of the differential pressure type and constitutes an improvement over the load handling mechanism disclosed in my prior copending application Serial No. 89,980, filed February 17, 1961, now Patent No. 3,134,231.

The differential pressure operating mechanism of the present invention like that disclosed in my aforementioned copending application, involves the use of large diameter columns more easily installed by means of top and bottom adapter plates to floor or ceiling of any structure, to thereby form a fixed structural member eliminating the necessity for auxiliary guides. The differential pressure operating mechanism furthermore involves a differential pressure displaced cylinder assembly slidably mounted on the column structure by widely spaced bearings so as to insure low bearing loads and in connection with the large diameter of the column structure to endow the differential pressure operating mechanism with a large eccentric load capacity. Furthermore, the pressure cavities defined within the cylinder assembly are of reduced volume requiring smaller volume of oil and consequently more rapid operating speed in axially displacing the eccentrically loaded cylinder assembly which is also capable of being rotated 360°. The construction of the differential pressure operated mechanism of the present invention in addition to the aforementioned attributes, provides additional advantages in connection with bearing load capacity, accessibility for servicing and enables the manufacture of component parts with increased economy. The mechanism of the present invention furthermore permits the assembly of a unit mechanism in accordance with a greater variety of design requirements from comparatively smaller numbers of standard sized variations in the component parts of a mechanism unit.

It is therefore a primary object of the present invention to provide a differential pressure operating mechanism utilizing an inner stepped diameter column structure cooperating with an outer cylinder assembly to define annular pressure cavities within which differential pressure forces are generated by introduction of fluid of any suitable type including oil in order to axially displace the cylinder assembly in a more rapid manner by virtue of the reduced volume of the pressure cavities so defined between the step diameter column and the cylinder assembly.

Another obpect of this invention is to provide a differential pressure operated eccentric load handling mechanism with which fluid handling equipment may be more efficiently associated by virtue of the fact that no flexible hose connections are required in order to accommodate movement of the outer cylinder assembly and furthermore optional mounting space is provided interiorly of the mechanism for the components of the fluid handling system associated with the pressure operated load handling mechanism.

An additional obpect of this invention involves improved facilities for dismantling the outer cylinder assembly without disassembly of the installation of the mechanism enabling replacement of bearing assemblies, repair of component parts of the cylinder assembly and inspection of the slide bearing surfaces on the inner column assembly.

A further object of this invention is to provide a differential pressure operated load handling mechanism the sliding surfaces of which are formed externally on portions of the column assembly rendering manufacture of the mechanism parts more economical since precision machining and finishing of outside diameters is easier than internal surfaces and further facilitating the inspection and maintenance of such surfaces.

A still further object of the present invention in accordance with the foregoing objects, is to provide a cylinder assembly slidably supported by an inner column assembly at three different spaced locations axially thereof so as to provide greater design flexibility with respect to eccentric loads to be handled and also providing for the attachment to and modification of the outer cylinder assembly without adversely affecting internal clearances and dimensions in a manner to adversely affect operation of the mechanism because of distortion and denting of the cylinder assembly.

In accordance with the foregoing object, the cylinder assembly of the present invention is formed from a number of sections by virtue of which a wider variety of different cylinder lengths are made available from a relatively limited number of standard size sections in order to meet desired spacing of bearings in accordance with eccentric loading and cylinder stroke.

Additional objects of the present invention include the formation of the inner supporting column assembly from a pair of differential diameter end portions interconnected by an enlarged diameter center section, the selection of standard diameter sizes for the column end portions within limits fixed by the center section diameter capable of more flexibly accommodating actuating force and fluid volume requirements.

The foregoing invention also embodies all of the advantages set forth with respect to the aforementioned copending application including the wide variety of load handling installations with which the mechanism may be associated.

These together with other objects and advantages which will become subsequent apparent reside in the details of construction and operation as more fully hereinafter described and claimed, reference being had to the accompanying drawings forming a part hereof, wherein like numerals refer to like parts throughout, and in which:

FIGURE 1 is a perspective view of a typical differential pressure operated load handling mechanism unit of the present invention.

FIGURE 2 is a longitudinal side elevational view of the pressure operated mechanism unit with parts broken away and shown in section.

FIGURE 3 is a perspective view of the inner supporting column assembly of the pressure operated mechanism with parts broken away and shown in section.

FIGURE 4 is a sectional view taken substantially through a plane indicated by section line 4—4 in FIGURE 2.

FIGURE 5 is a partial sectional view of a modified orm of cylinder assembly.

FIGURE 6 is a partial sectional view of a further modi- cation of the cylinder assembly.

FIGURE 7 is a longitudinal side elevational view with arts broken away and shown in section of another form f pressure operated mechanism.

FIGURE 8 is a partial sectional view taken through a lane indicated by section line 8—8 in FIGURE 7 illus- ating a still further modification of the cylinder as- embly as illustrated in FIGURE 2.

Referring now to the drawings in detail, the pressure perated mechanism of the present invention involves an ssembled unit generally referred to by reference numeral 0 in FIGURE 1 mounted for example between an an- horing floor 12 and ceiling 14. An inner column as- embly 16 axially projecting beyond both ends of an outer ylinder or tubular housing assembly 18 is therefore an- hored to the floor and ceiling by suitable adapter anchor evices *or mounting brackets* depending upon the installa- on. An eccentric load schematically referred to by ref- rence numeral 20 is therefore attached *by any load sup- ort means* in any suitable manner to the outer cylinder ssembly 18 for displacement with the cylinder assembly long the inner column assembly 16. Reference to my rior copending application aforementioned, will indicate ie wide variety of installational arrangements with which ach unit or combination of units 10 may be associated *cluding load elevators for trucks.* Also, the significance nd advantages arising from the particular installation ounting facilities and load carrying facilities of the unit 0 will become apparent.

Referring now to FIGURE 2 in particular, it will be bserved that the inner supporting or guide column as- embly 16 includes a central section generally referred to y reference numeral 22 *constituting a piston* to which a nall diameter end portion 24 is connected at one axial nd while the large diameter end portion 26 is connected the other axial end of the center section 22. The center ection is therefore formed by a cylindrical wall member 8 the external surface of which is precision machined nd finished to define a sliding bearing surface 30. End late members 32 and 34 are welded to the opposite axial nds of the cylindrical wall member 28 to enclose a cham- er 36 therewithin. The small diameter end portion 24 of ie column assembly is coaxially positioned with respect the center section 22 by means of the end plate member 2 and welded thereto. The end portion 24 is also formed f a cylindrical wall member 38 having an end closure iember 40 welded thereto and a head member 42 welded the cylindrical wall member 38 adjacent to but spaced om the opposite axial end to define a fluid passage space 4 together with the end plate member 32 of the center ection 22. The cylindrical wall member 38 is provided ith fluid passages or apertures 46 in communication with ie passage space 44 for cooperation with the fluid han- ling facilities to be described hereafter. The end portion 4 also defines a chamber 48 between the enclosure mem- er 40 and the head member 42. Similarly connected in axial alignment with the center section 22, is the large iameter end portion 26 including a cylindrical wall mem- er 50 having welded thereto adjacent one axial end, the nclosure member 52 and adjacent the opposite axial end ie head member 54. A passage space 56 is also formed etween the head member 54 and the end plate member 4 of the center section which space 56 is in fluid com- unication with apertures 58. The cylindrical wall mem- ers 38 and 50 of the end portions thus form external earing surfaces of different diameter for cooperation with ie spaced slide bearings of the cylinder assembly 18. lowever, the column assembly 16 itself is independently ounted at the desired location as shown in FIGURE 3 nd forms a guide column *or a stationary piston rod* in ddition to its other functions in connection with the fluid perated mechanism unit 10.

The cylinder assembly 18 is axially slidable with respect to the column assembly and is also rotatable without restriction thereabout. The cylinder assembly however is assembled from separate components the axial lengths of which may be varied in accordance with the desired spacings of the bearings along the sliding sur- faces of the column assembly in accordance with cylinder stroke or eccentric load capacity. The cylinder assembly is thus formed of a pair of outer casing sections 60 and 62 of variable length respectively defining pressure differ- ential cavities 64 and 66 about the column assembly. The volumes of the pressure cavities 64 and 66 will therefore be determined by the axial lengths of the outer casing sections 60 and 62 and the diameters of the end portions of the column assembly. The outer casing section 62 there- fore tapers radially inwardly for connection by welding to an end slide bearing assembly 68 which includes a bear- ing mounting sleeve 70 to which the outer casing 62 is welded, the sleeve 70 internally mounting a sleeve bearing 72 spaced from fluid wiping packing 74 maintained assem- bly within the sleeve 70 by a gland 76 secured by fastener 78 to the sleeve 70 and covered by the gland ring 80. Asso- ciated with the other outer casing section 60, is an end bearing assembly 82 of a diameter reduced with respect to the end bearing assembly 68 for engagement with the slid- ing bearing surface of the small diameter portion 24 of the column assembly. The end bearing assembly 82 there- fore also includes a mounting sleeve 84 interiorly mount- ing a bearing sleeve 86 spaced from the packing 88 which is maintained assembled by the gland 90 secured to the sleeve by the fasteners 92 and covered by the gland ring 94. The end bearing assembly 82 is however not directly connected to the outer casing section 60 which is uniform in diameter throughout its length unlike the casing sec- tion 62. Instead, the casing section 60 is interconnected to its associated end bearing assembly 82 by a pressure head member 96 respectively welded to the end bearing sleeve 84 and to the casing section 60 interiorly thereof. The cylinder assembly is completed by the interconnection of the outer casing sections 60 and 62 to each other in axially spaced relation by the dynamic slide bearing as- sembly generally referred to by reference numeral 98.

The slide bearing assembly 98 not only facilitates the assembly and disassembly of the cylinder 18 without requiring removal of the inner column assembly but also provides an intermediate slide bearing between the end bearing assemblies 68 and 82. The slide bearing assem- bly 98 furthermore maintains the pressure cavities 64 and 66 in fluid tight relation to each other. The slide bearing assembly 98 therefore includes a pair of axially aligned mounting sleeves 100 and 102 which respectively mount interiorly thereof for contact with the slide bear- ing surface 30 of the center section, bearing sleeves 104 and fluid wiping packing 106. A leakage preventing clamping structure generally referred to by reference numeral 108 maintains the packing 106 in assembled spaced relation. The clamping structure 108 as more clearly seen in FIGURES 2 and 4, includes clamping flanges 110 and 112 spaced from each other by an annu- lar portion of a gland 114 in engagement with the external surface of the center section 22, said clamping flanges being secured to each other by means of cap screws 116 that extend also through the gland member 114. The clamping structure 108 of the bearing assem- bly 98 therefore not only permits easy dismantling of the cylinder assembly without disassembly of the column structure, but also maintains the pressure cavities 64 and 66 in fluid tight relation to each other. Thus to replace a leaky packing, the fastening bolts 116 are removed so as to merely separate the mounting sleeves 100 and 102 for removal of the packing gland 114 and packings 106 for example, without requiring any fur- ther dissassembly of parts. FIGURE 5 illustrates a modi- fied form of bearing assembly wherein the bearing mount- ing sleeves 118 and 120 are in abutting relation to each other and are internally recessed for receiving therebetween the gland member 122. Abutting flanges 124 and 126 are respectively welded to the mounting sleeve members 118 and 120 for clamping said sleeve members to each other by means of cap screws. FIGURE 6 illustrates a further modification of the clamping structure wherein the bearing mounting sleeve members 128 and 130 are grooved not only to receive therebetween the gland member 122 as described with respect to FIGURE 5 but also for interfitting relation to each other assuring thereby axial alignment. The sleeve members 128 and 130 therefore are respectively formed with annular recesses 132 and 134 for such purpose. Abutting clamping flanges 136 and 138 are therefore also welded to the abutting ends of the sleeve members 128 and 130 and are provided with cap screws for securing them together. FIGURE 8 illustrates a still further modification wherein the mounting sleeve members 140 and 142 are secured to each other by threaded engagement between threaded portions 144 and 146 of the sleeve members. The fluid wiping packings 148 are spaced from each other in this latter arrangement by the gland member 150 disposed in axial alignment with the threaded portions of the sleeve member.

It will be observed from FIGURES 2, 3 and 4, that a pair of fluid handling feeder pipes 152 and 154 extend through the chamber 156 of the larger diameter end portion 26 of the column assembly and are welded to the enclosure member 52 and end plate member 54. The fluid handling conduit 154 therefore provides fluid communication with a fluid handling system exterior to the pressure operated mechanism 10 [and] *through a conduit connected thereto as shown by dotted line in FIGURE 2 for controlling the flow of hydraulic fluid to* the annular pressure chamber 66 through the passage space 56 and aperture 58. The fluid handling feeder conduit 152 on the other hand provides fluid communication between [an] *the* exterior fluid handling system associated with the unit 10 and the differential pressure actuating cavity 64 through the passage space 44 and aperture 46. The conduit 154 therefore also extends through the chamber 36 of the center section 22 and is also welded to the end plate members 32 and 34 thereof. From the foregoing description, it will be appreciated that fluid under increasing pressure supplied by the conduit 152 to the pressure cavity 64 will react between the axial end of the bearing mounting sleeve 100 and the pressure head member 96 tending to displace the cylinder assembly in an upward direction with respect to the column assembly as viewed in FIGURE 2. Fluid pressure may at the same time exist within the chamber 66 equalizing the pressure on the slide bearing assembly 98 without developing however the displacing differential force in view of the substantially equal end surfaces of the mounting sleeve member 102 and bearing sleeve member 70 defining the opposite axial ends of the annual pressure cavity 66. The conduit 154 may therefore simultaneously exhaust the fluid from the cavity 66 as the cylinder assembly is displaced upwardly by an increasing pressure of fluid generated by the fluid handling system associated with the pressure operated mechanism unit 10. Controlled venting of the pressure within the pressure cavities through the conduits 152 and 154 may thereby provide for load controlled movement of the cylinder assembly in a downward direction as viewed in FIGURE 2. Although the conduits 152 and 154 are illustrated in FIGURE 2 as being connected through the lower end of the unit 10 providing fluid communication to the fluid passage spaces 44 and 56, it will be appreciated that the conduit may be introduced from the opposite or upper end of the unit if so desired. It will be furthermore appreciated, that the conduit connections offered by the pipes 152 and 154 avoid the use of flexible hosing for supplying fluid to the pressure cavities within the cylinder assembly. Furthermore, it will be appreciated that instead of providing fluid communication to one end of the unit, connections to the associated fluid handling system may be provided by conduits extending through both chambers of the end portions of the column assembly as indicated in FIGURE 7 wherein conduits 158 and 160 are respectively mounted in the chambers 48 and 156 of the differential diameter end portions. FIGURE 7 further illustrates an alternative fluid connection to the fluid passage spaces 56 and 44 through openings 162 and 164 in the cylindrical walls of the cylinder assembly casing sections. A still further alternative arrangement may involve the mounting of the fluid handling system components such as the pump and fluid reservoir within the axially spaced chambers 48, 36 and 156 of the column assembly 16.

From the foregoing description, operation and utility of the differential pressure operated eccentric load handling mechanism unit will be apparent. It will therefore be appreciated, that precision machining and finishing of the outside diameters of the different portions of the inner column assembly rather than the machining or finishing of inside surfaces effects great economy in both manufacture of the unit and maintenance of the slide bearing surfaces thereof. Also, the section construction of the cylinder assembly enables the partial dismantling thereof without disassembly of the column structure for parts replacement and inspection purposes as hereinbefore indicated which is of considerable advantage from a maintenance standpoint. Furthermore, the section construction of the cylinder assembly together with the step diameter section construction of the inner column assembly more widely accommodates a variety of different design requirements with a relatively limited number of standard size components as hereinbefore indicated. The arrangement also inherently provides for larger eccentric load capacity by providing an intermediate bearing. Moreover, the intermediate bearing arrangement for the cylinder assembly facilitates field modification, welding or attachment of load carrying structures to the casing sections without adversely affecting the operating characteristics of the mechanism because of dimensional distortions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fluid pressure load handling mechanism comprising, column means having spaced slide bearing surfaces externally formed therein, tubular housing means spaced throughout in surrounding relation to said column means to define a plurality of annular pressure cavities, and a plurality of fixedly spaced side bearing assemblies operatively mounted on the housing means in sliding engagement with said bearing surfaces of the column means on opposite axial sides of said pressure cavities supporting the housing means on the column means for relative movement therebetween, said column means including a center section having an enlarged external diameter and axial end portions of different external diameters less than said enlarged external diameter of the center section, each of said center section and said end portions defining said spaced slide bearing surfaces.

2. The combination of claim 1, including axially spaced chambers formed within said column means, fluid handling means mounted in said axially spaced chambers and fluid passage means disposed between said axially spaced chambers providing fluid communication between said annular pressure cavities and said fluid handling means.

3. A fluid pressure load handling mechanism comprising, variable diameter column means having spaced slide ıearing surfaces externally formed thereon, cylinder means lidably mounted on said column means and defining a ılurality of annular pressure cavities, slide bearing assemıly means operatively connected to the cylinder means or assembly thereof in sliding relation to the column neans at a plurality of fixedly spaced locations on oppoite axial sides of said pressure cavities, said column neans including a center section having an enlarged exernal diameter and axial end portions of different exterıal diameters less than said enlarged external diameter ıf the center section, each of said center section and end ıortions defining said spaced slide bearing surfaces, axially paced chambers formed within said column means, fluid ıandling means mounted in said axially spaced chambers .nd fluid passage means disposed between said axially paced chambers providing fluid communication between aid annular pressure cavities and said fluid handling neans, said cylinder means comprising, a pair of axially paced casing sections interconnected by said slide bearng assembly means, a pair of end bearing assemblies, ıne of said bearing assemblies being directly connected to ıne of said casing sections to define one of said pressure :avities, and differential pressure head means interconıecting the other end bearing assembly and casing secion to define the other pressure cavity.

4. The combination of claim 3, wherein said slide bearng assembly means comprises, a pair of axially aligned nounting sleeves, leakage preventing clamp means securng said mounting sleeves in assembled relation and fluid viping bearing means internally mounted by the mountng sleeves for engagement with a slide bearing surface of he column means on opposite sides of the clamp means o provide bearing support for the cylinder means and eparate the pressure cavities thereof.

5. The combination of claim 4, wherein said clamp neans includes adjacent end clamp flanges connected to aid mounting sleeves and gland means disposed therebeween and in engagement with said slide bearing surface ıf the column means.

6. A fluid pressure load handling mechanism comprisng, column means having spaced slide bearing surfaces :xternally formed therein, tubular housing means spaced hroughout in surrounding relation to said column means o define a plurality of annular pressure cavities, and a ılurality of fixedly spaced slide bearing assemblies operaively mounted on the housing means in sliding engagenent with said bearing surfaces of the column means on ıpposite axial sides of said pressure cavities supporting he housing means on the column means for relative novement therebetween axially spaced chambers formed vithin said column means, fluid handling means mounted n said axially spaced chambers and fluid passage means lisposed between said axially spaced chambers providing luid communication between said annular pressure caviies and said fluid handling means.

7. A fluid pressure load handling mechanism comprisng, column means having spaced slide bearing surfaces :xternally formed therein, tubular housing means spaced hroughout in surrounding relation to said column means o define a plurality of annular pressure cavities, and a ılurality of fixedly spaced slide bearing assemblies operaively mounted on the housing means in sliding engagenent with said bearing surfaces of the column means on ıpposite axial sides of said pressure cavities supporting he housing means on the column means for relative novement therebetween, said cylinder means comprising, ı pair of axially spaced casing sections interconnected by aid slide bearing assembly means, a pair of end bearing ıssemblies, one of said bearing assemblies being directly :onnected to one of said casing sections to define one of aid pressure cavities, and differential pressure head means nterconnecting the other end bearing assembly and casng section to define the other pressure cavity.

8. The combination of claim 7, wherein said column neans includes a center section having an enlarged external diameter and axial end portions of different external diameters less than said enlarged external diameter of the center section, each of said center section and end portions defining said spaced slide bearing surfaces.

9. A fluid pressure load handling mechanism comprising, column means having spaced slide bearing surfaces externally formed therein, tubular housing means spaced throughout in surrounding relation to said column means to define a plurality of annular pressure cavities, and a plurality of fixedly spaced slide bearing assemblies operatively mounted on the housing means in sliding engagement with said bearing surfaces of the column means on opposite axial sides of said pressure cavities supporting the housing means on the column means for relative movement therebetween, said slide bearing assembly means comprising, a pair of axially aligned mounting sleeves, leakage preventing clamp means securing said mounting sleeves in assembled relation and fluid wiping bearing means internally mounted by the mounting sleeves for engagement with a slide bearing surface of the column means on opposite sides of the clamp means to provide bearing support for the cylinder means and separate the pressure cavities thereof.

10. In a fluid pressure actuating device, a tubular housing assembly having opposite axial ends, a column assembly having spaced slide bearing surfaces extending through the housing assembly in radially spaced relation thereto, a plurality of load sustaining slide bearings fixedly mounted by the housing assembly adjacent to and intermediate said opposite axial ends for movably supporting the housing assembly on the column assembly, said slide bearings being respectively in sliding contact with said spaced slide bearing surfaces, means defining separate axially spaced pressure chambers between each of the slide bearings and means for supplying fluid under pressure to said pressure chambers.

11. In a fluid pressure actuating device, a tubular housing assembly open at opposite axial ends thereof, a column assembly having spaced slide bearing surfaces extending through the housing assembly radially spaced therefrom throughout, a plurality of fixedly spaced slide bearings mounted by the housing assembly adjacent to and intermediate said opposite axial ends for movably supporting the housing assembly on the column assembly, said slide bearings being respectively in sliding contact with said spaced slide bearing surfaces to define axially spaced pressure chambers between each of the slide bearings adjacent said opposite axial ends and the slide bearings intermediate the axial ends, and a plurality of seal means mounted by the housing assembly at the axial ends thereof and between the intermediate slide bearings for wiping engagement with said slide bearing surfaces on the column assembly to pressure seal the pressure chambers.

12. The combination of claim 11 wherein the housing assembly comprises axially separable sections, and means for disconnectably securing said sections together between the intermediate slide bearings to permit inspection of the slide bearing surfaces and replacement of the those seal means located between said intermediate slide bearings, by axial separation of said sections.

13. In a fluid pressure actuating device, a tubular housing assembly open at opposite axial ends thereof, a column assembly having spaced slide bearing surfaces extending through the housing assembly radially spaced therefrom throughout, a plurality of fixedly spaced slide bearings mounted by the housing assembly adjacent to and intermediate said opposite axial ends for movably supporting the housing assembly on the column assembly, said slide bearings being respectively in sliding contact with said spaced slide bearing surfaces to define axially spaced pressure chambers between each of the slide bearings adjacent said opposite axial ends and the slide bearings intermediate the axial ends, said housing assembly comprising axially separable sections, and means for disconnectably securing said sections together between the intermediate slide bearings to permit inspection of the slide bearing surfaces by axial separation of said sections.

*14. A truck elevator comprising a cylinder surrounding a piston rod, said piston rod extending through and beyond the ends of said cylinder, a piston fixed to said rod within said cylinder, whereby said cylinder may be reciprocated along said rod, said piston defining end walls of an upper and lower chamber in said cylinder, conduit means connected to the upper chamber in said cylinder, conduit means connected to the lower chamber in said cylinder, means associated with each of said conduit means for controlling the flow of hydraulic fluid through said conduit means, a first passage extending through said rod and opening into said upper chamber on one side of said piston, a second passage extending through said rod and opening into said lower chamber on the other side of said piston, said passages being in communication with said conduit means, mounting brackets securing the ends of said rod in an upright disposition, said cylinder being mounted for rotation about its longitudinal axis, load support means secured to said cylinder for movement with sadi cylinder, and said load support means including at least one support plate extending in a direction substantially perpendicular to the longitudinal axis of said cylinder.*

References Cited

The following references, cited by the Examiner, are of record in the patented file of this patent or the original patent.

UNITED STATES PATENTS

| | | | |
|---|---|---|---|
| 2,036,967 | 4/1936 | Lundberg et al. | 91—36 X |
| 2,444,474 | 7/1948 | Somes et al. | 92—117 A |
| 2,474,336 | 6/1949 | Stone | 92—2 |
| 2,550,925 | 5/1951 | Weimar | 92—110 |
| 2,930,499 | 3/1960 | Landen | 214—75 |
| 3,134,231 | 5/1964 | McCreery | 92—117 X |
| 3,291,261 | 12/1966 | Robb | 187—9 |
| 841,649 | 1/1907 | Howe et al. | 121—50 |
| 904,567 | 11/1908 | Shevlin et al. | 121—123 |
| 945,462 | 1/1910 | Klein et al. | 121—123 |
| 2,451,089 | 10/1948 | Hunter | 309—3 |
| 2,610,613 | 9/1952 | Bryant. | |
| 2,625,115 | 1/1953 | Maloney | 92—169 |

MARTIN P. SCHWADRON, Primary Examiner

I. C. COHEN, Assistant Examiner

U.S. Cl. X.R.

92—111, 152, 161; 189—9; 214—75, 730